United States Patent [19]

Wolf

[11] Patent Number: 4,582,229
[45] Date of Patent: Apr. 15, 1986

[54] GRANULAR CHEMICAL METER FEED WHEEL ADJUSTMENT

[75] Inventor: Lester C. Wolf, East Moline, Ill.

[73] Assignee: Deere & Company, Moline, Ill.

[21] Appl. No.: 546,688

[22] Filed: Oct. 28, 1983

[51] Int. Cl.$^4$ .................. B65D 88/54; G01F 11/40
[52] U.S. Cl. ................... 222/288; 222/282; 222/305; 222/314; 403/26; 403/158; 384/255
[58] Field of Search ............... 222/282, 311, 312, 314, 222/315, 410, 411, 285, 305, 306, 28, 41, 46, 23, 25, 43, 47, 288; 239/650, 681; 384/255; 403/351, 365, DIG. 7, 26, 158

[56]  References Cited

U.S. PATENT DOCUMENTS

| | | | |
|---|---|---|---|
| 1,090,216 | 3/1914 | Kennedy | 384/255 |
| 3,124,370 | 3/1964 | Traugott | 280/661 |
| 3,190,506 | 6/1965 | Selzler | 222/314 |
| 4,234,105 | 11/1980 | Viramontes | 222/233 |

OTHER PUBLICATIONS

International Harvester Company, Operator's Manual, 1096 511 R1., 11-1980
Gandy Company, brochure, Form CRA 9-80-DM, pp. 2 and 7

Primary Examiner—Joseph J. Rolla
Assistant Examiner—Louise S. Heim
Attorney, Agent, or Firm—Henderson & Sturm

[57]     ABSTRACT

A material metering device having a feed wheel adjustably positioned above the housing discharge orifice. The feed wheel is disposed to rotate on a shaft journalled in an eccentric bearing. The bearing is attached to the meter housing and has a bearing body selectively rotatable to and selectively securable in a plurality of distinct positions.

4 Claims, 9 Drawing Figures

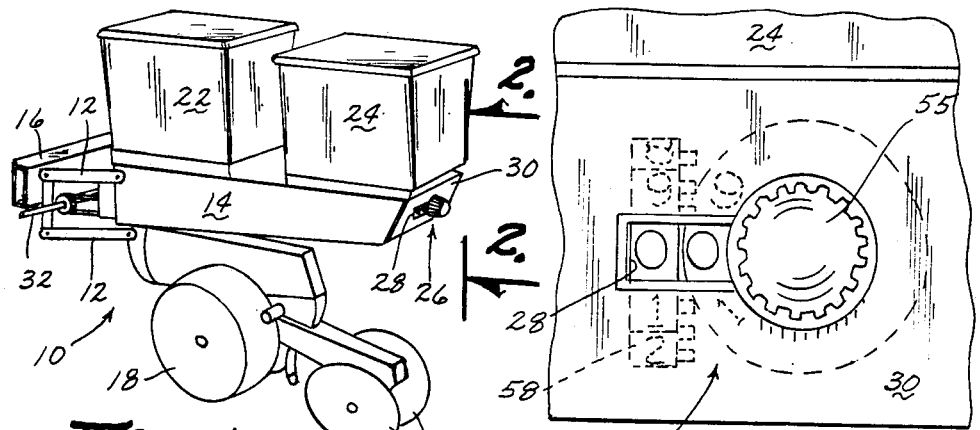
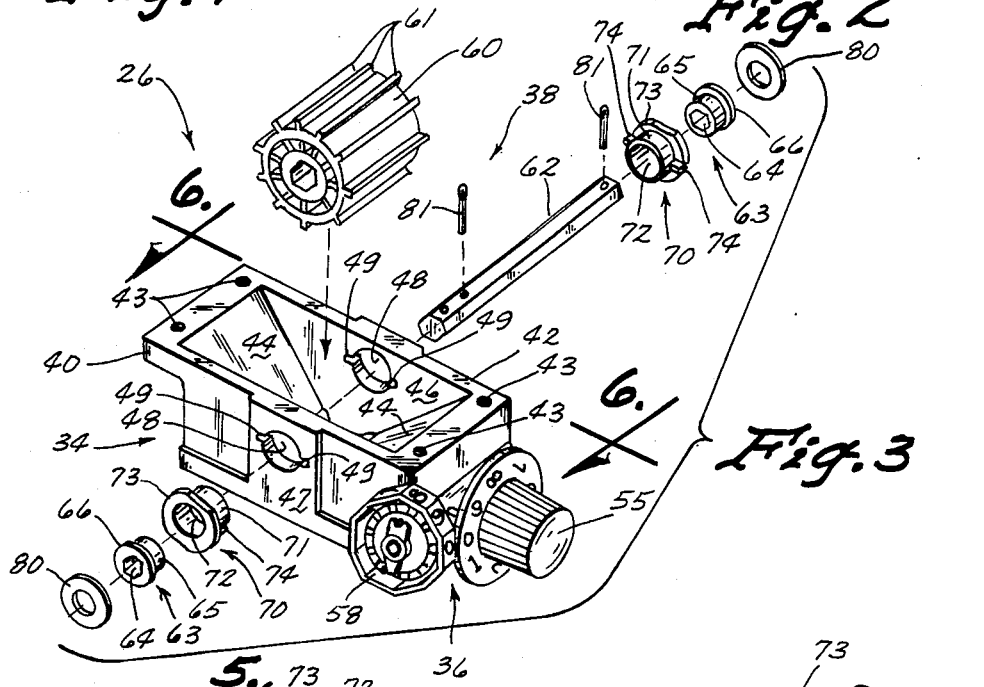
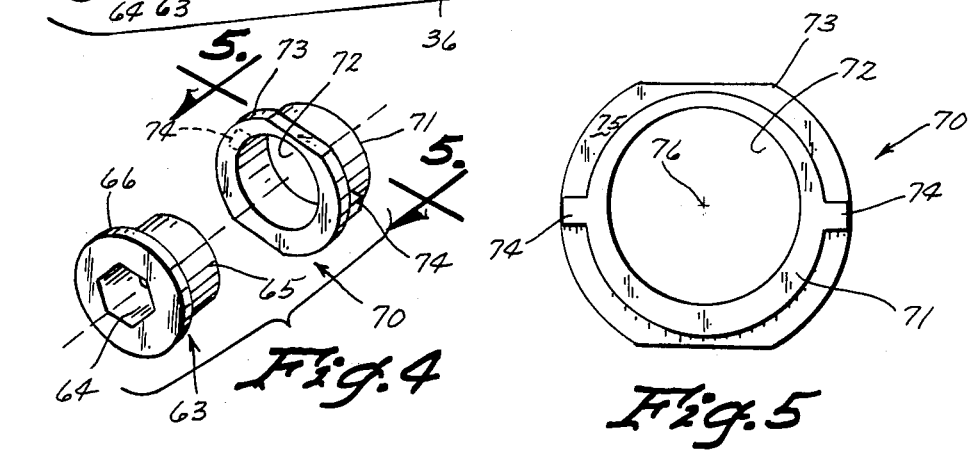

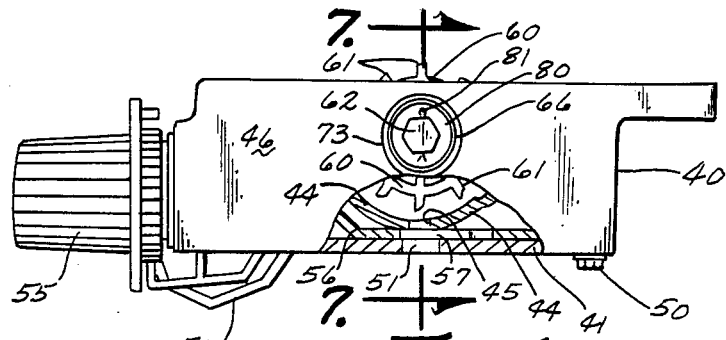
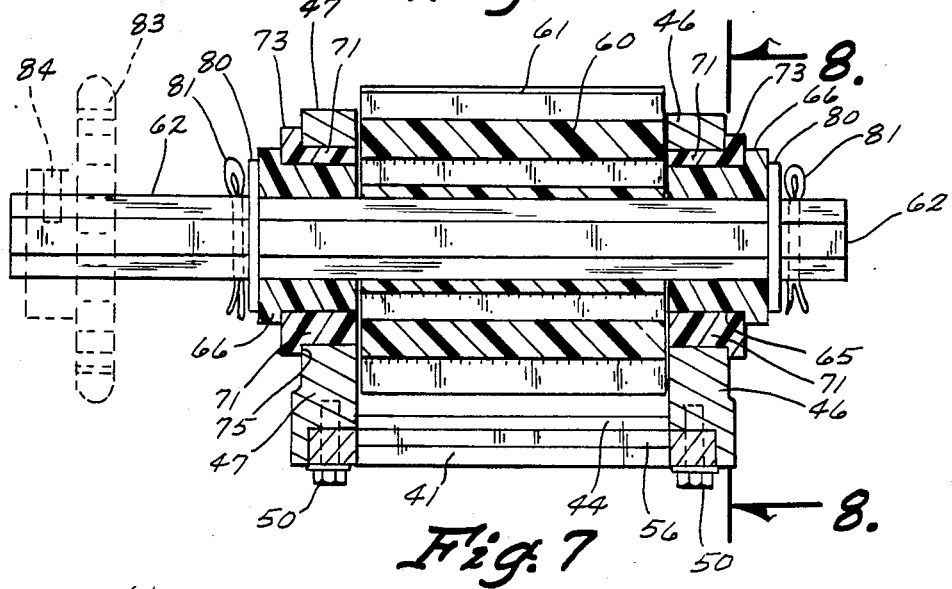
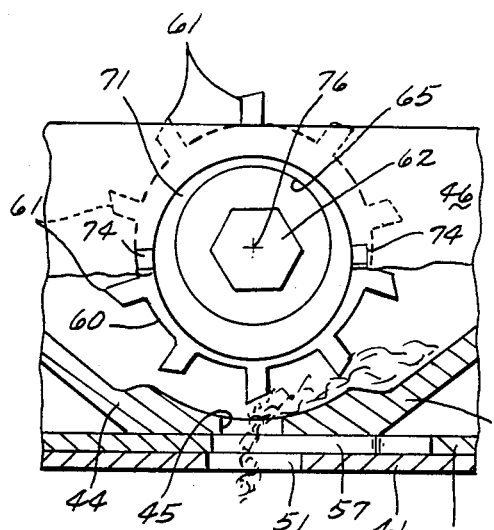
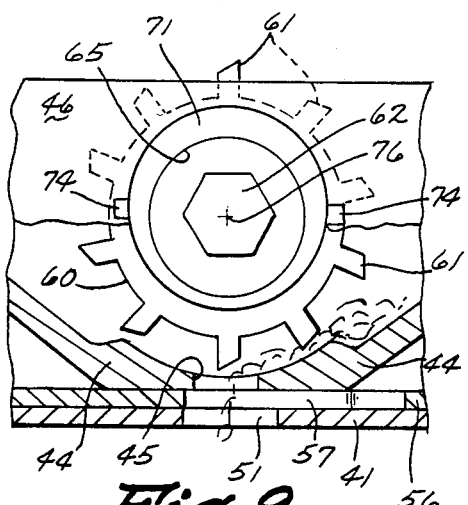

GRANULAR CHEMICAL METER FEED WHEEL ADJUSTMENT

TECHNICAL FIELD

This invention relates to chemical material metering devices of the type used in conjunction with agricultural planting units to meter the application of chemicals during the planting operation, and more particularly to granular chemical metering devices having adjustable feed wheels.

BACKGROUND ART

Chemical material metering devices are used to meter chemicals, such as granular insecticides or herbicides, at an application rate recommended by the chemical supplier. Typically, a chemical storage hopper carries a supply of material that is fed by gravity into a metering device located at the bottom of the storage hopper.

Conventional metering devices include a feed wheel or agitator that is disposed to rotate over a metering orifice to aid in feeding material through the orifice. Rotation of the feed wheel provides for an even flow of material by agitating the material in the vicinity of the orifice. This agitation prevents bridging or caking that might otherwise occur and cause a blockage of the orifice and an interruption in the flow of material.

Chemical metering devices are used to apply a wide variety of chemicals. These chemicals use a variety of carriers for the active ingredient including a clay material and a sand material. As compared to chemicals using a sand carrier, chemicals having a clay carrier require a greater clearance between the feed wheel and the metering orifice to achieve the optimum agitation and flow characteristics.

A known method of providing for varying clearance to achieve optimum performance of a metering device with varying chemicals is to provide separate feed wheels of different size. This solution to the problem requires the operator to maintain an inventory of alternate feed wheels, and requires considerable operator time to effect the change.

Those concerned with these and other problems recognize the need for an improved material metering device.

DISCLOSURE OF THE INVENTION

The present invention provides a material metering device employing a feed wheel that is easily adjustable to vary the clearance between the feed wheel and the discharge orifice. The feed wheel is disposed to rotate on a shaft within the housing of the metering device. Each end of the shaft is received within an eccentric opening in the body of a bearing and the body of the bearing is selectively rotated to one of a number of distinct positions whereby the axis of rotation of the shaft and the feed wheel are adustably positioned above the metering orifice.

The eccentric bearing is selectively rotated and secured by engagement of a tab on the body of the bearing with one of a number of notches formed in an aperture in the housing sidewall. To adjust the clearance of the feed wheel a cotter pin is removed and the eccentric bearing is simply moved out from the housing sidewall on the shaft until the tab is completely retracted from a notch. The bearing is then rotated to a point where the tab is aligned with a second notch, the bearing is moved toward the housing so that the tab engages the second notch and the bearing is secured against axial movement by reinserting the cotter pin.

An object of the present invention is to provide an improved material metering device.

Another object of the present invention is the provision of a material metering device having an adjustable feed wheel.

A further object of the present invention is to provide a material metering device which can be easily and conveniently adjusted to vary the clearance between the feed wheel and the discharge orifice.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of a planting unit employing the material metering device of the present invention;

FIG. 2 is a greatly enlarged rear elevational view taken along line 2—2 of FIG. 1;

FIG. 3 is an exploded perspective view of the material metering device of the present invention;

FIG. 4 is an enlarged exploded perspective view showing the eccentric bearing and a smaller hex shaft bearing which rotates within the eccentric bearing;

FIG. 5 is an enlarged elevational view taken along line 5—5 of FIG. 4;

FIG. 6 is a side elevational view taken along line 6—6 of FIG. 3, wherein a portion of the housing is cut away to show the spatial relationship of the feed wheel and the discharge orifice;

FIG. 7 is an enlarged rear elevation sectional view taken along line 7—7 of FIG. 6;

FIG. 8 is a side elevation sectional view taken along line 8—8 of FIG. 7, wherein a portion of the housing is cut away and the feed wheel is shown in a raised position with respect to the discharge orifice; and FIG. 9 is a side elevation sectional view similar to FIG. 8, wherein the eccentric bearing has been rotated 180° and the feed wheel is in a lowered position with respect to the discharge orifice.

BEST MODE FOR CARRYING OUT THE INVENTION

Referring now to the drawings, wherein like reference numerals designate identical or corresponding parts throughout the several views, FIG. 1 shows a planting unit (10) mounted by parallel linkage bars (12) which interconnect the subframe (14) of the planting unit (10) to a main frame (16). The parallel linkage bars (12) provide for independent vertical movement of the planting unit (10) with respect to other planting units carried by the main frame (16).

The subframe (14) is supported by a pair of adjustable gauge wheels (18) which control the depth of the furrow opening disks (not shown). A pair of closing wheels (20) are supported by the subframe (14) rearwardly of the gauge wheels (18). The closing wheels (20) exert a downwardly and inwardly directed force adjacent the formed furrow sufficient to collapse the formed furrow wall to provide a uniform soil cover for the deposited seeds.

The upper portion of the subframe (14) supports a seed hopper (22) including a seed meter (not shown), and a granular chemical hopper (24) including a material metering device (26) which is visible through a window opening (28) in the rear hopper support bracket (30) (FIG. 2). Both the seed meter and the chemical material meter (26) are operably connected to a main drive (32) (FIG. 1).

Referring now to FIG. 3, the material metering device (26) includes a housing (34), a flow rate adjustment and indicator mechanism (36); and a feed wheel assembly (38).

As most clearly shown in FIGS. 3 and 6, the housing (34) includes a main body portion (40) and a bottom cover plate (41). The housing body (40) has a top rim (42) including a number of threaded openings (43) by which the housing body (40) is attached by conventional means to the bottom of the chemical hopper (24). Downwardly converging interior walls (44) converge toward an elongated discharge orifice (45) and opposing sidewalls (46) and (47) include circular openings (48), each of which has a pair of oppositely directed radial notches (49). The bottom cover plate (41) includes a planar section having openings formed therein for attachment by bolts (50) to the lower portion of the housing body (40). Also formed in the planar section is an elongated slot (51) which is disposed directly below the elongated discharge orifice (45) when the housing (34) is assembled (FIG. 6).

Still referring to FIGS. 3 and 6, the flow rate adjustment and indicator mechanism (36) includes an actuator knob (55) operably attached to a metering gate (56) which is slideably received in the housing (34) intermediate the downwardly converging housing walls (44) and the bottom cover plate (41). The metering gate (56) has a metering opening (57) formed therein. Rotation of the actuator knob (55) acts to slideably move the metering gate (56) to vary the size of the discharge orifice (45) and thereby adjustably regulate the flow rate of material from the housing (34). A follower wheel (58) is operably connected to and rotated by the actuator knobs (55) such that the reading appearing in the viewing window (28) indicates the flow rate of material from the housing (34) (FIG. 2).

The feed wheel assembly (38) is best shown in FIG. 3. A feed wheel or agitator (60) having radially extending fins (61) is carried on a hex shaft (62) which in turn is supported at its ends by a pair of hex shaft bearings (63). Each of the saft bearings (63) has an internal opening (64) of the configuration of the shaft (62), a circular external bearing surface (65), and a flange portion (66).

The eccentric bearings (70) include a body portion (71) and a circular opening (72) eccentrically disposed with respect to the body portion (71) (FIG. 5). A radial flange (73) extends from one end of the body (71) and a pair of counteropposing tabs (74) extend radially from the body (71) adjacent the inner face (75) of flange (73).

The eccentric bearings (70) are received within the circular housing sidewall openings (48) such that the tabs (74) matingly engage the notches (49) and secure the eccentric bearing (70) against rotation with respect to the sidewalls (46) and (47). The inner face (75) of the eccentric bearing flange (73) contacts the sidewalls (46) and (47) and secures the eccentric bearing (70) against axial movement. The shaft bearings (63) are journalled for rotational movement within the eccentric opening (72) of the eccentric bearing (70). The eccentric opening (72) receives the circular external bearing surface (65) of the shaft bearing (63) and the flange portion (66) thereof contacts the outer face of flange (73). Washers (80) are disposed adjacent the shaft bearings (63), and cotter pins (81) secure the shaft (62) for rotational movement about an axis which intersects the center (76) of the eccentric openings (72) (FIG. 5). A driven spur gear (83) is attached to one end of the shaft (62) by set screw (84) (FIG. 7) and is operably connected to the main drive (32) (FIG. 1).

FIGS. 5–8 show the eccentric bearing (70) oriented so that the center (76) of the eccentric opening (72) and the axis of rotation of the shaft (62) is in a raised position. In this raised position, the fins (61) of the feed wheel (60) are disposed to rotate at the maximum distance above the discharge orifice (45). This spatial relationship of the feed wheel (60) and the discharge orifice (45) is desirable when metering granular chemicals having a clay carrier.

When it is desirable to decrease the spacing between the feed wheel (60) and the discharge orifice (45), such as when chemicals having a sand carrier are being used, the eccentric bearing (70) is simply rotated 180°. This adjustment is accomplished by removing the cotter pins (81), and sliding the eccentric bearings (70) together with the saft bearings (63) and washers (80) away from the housing (34) until the tabs (74) are completely retracted from the notches (49). The eccentric bearing (70) is then rotated 180°, so that the tabs (74) are again aligned with the notches (49), sliding the eccentric bearings (70) together with the shaft bearings (63) and washers (80) toward the housing (34), and reinserting the cotter pins (81). FIG. 9 shows the feed wheel (60) in the lowered position.

Obviously, many modifications and variations of the present invention are possible in light of the above teachings. It is therefore to be understood that, within the scope of the appended claims, the invention may be practiced otherwise than as specifically described.

I claim:

1. In a material metering device including a housing having a discharge orifice, and a feed wheel carried on a shaft journalled for rotation within said housing, said feed wheel being disposed to rotate above and adjacent to said discharge orifice, the improvement comprising:

a bearing attached to said housing, said bearing having body portion and an opening eccentrically disposed with respect to said body portion, said shaft being received within said eccentric opening and being rotatable about an axis intersecting the center of said eccentric opening;

means for selectively rotating said bearing to selectively move said eccentric opening to a plurality of distinct rotated positions, whereby the axis of rotation of said shaft and said feed wheel are adjustably positioned above said discharge orifice;

means for securing said bearing in one of said rotated positions;

wherein said means for selectively rotating the bearing includes an aperture formed in said housing, and a surface formed on the body portion of said bearing, said surface being disposed to matingly engage said aperture in a plurality of distinct rotated positions, wherein said aperture is a circular opening having a plurality of radial notches, and wherein said body portion of said bearing includes a radial tab disposed to matingly engage one of said radial notches, said aperture including a pair of counteropposing radial notches;

wherein said body portion of said bearing includes a pair of counteropposing radial tabs disposed to matingly engage said radial notches, and a radially extending flange disposed to extend beyond the housing aperture, said flange having an inner face disposed in contacting relationship with a wall of said housing; and wherein one of said tabs is attached to and extends from the inner face of said flange.

2. The metering device of claim 1 wherein said housing aperture is symmetrical.

3. In a material metering device including a housing having a discharge orifice, and a feed wheel carried on a shaft journalled for rotation within said housing, said feed wheel being disposed to rotate above and adjacent to said discharge orifice, the improvement comprising:

a bearing attached to said housing, said bearing having a body portion and an opening eccentrically disposed with respect to said body portion, said shaft being received within said eccentric opening and being rotatable about an axis intersecting the center of said eccentric opening;

means for selectively rotating said bearing to selectively move said eccentric opening to a plurality of distinct rotated positions, whereby the axis of rotation of said shaft and said feed wheel are adjustably positioned above said discharge orifice;

means for securing said bearing in one of said rotated positions, wherein said means for securing the bearing includes an aperture formed in said housing, said aperture including a circular opening having a pair of counteropposing radial notches, and a pair of counteropposing radial tabs extending from said body portion of said bearing and disposed to matingly engage said radial notches; and wherein said body portion of said bearing includes a radially extending flange disposed to extend beyond the housing aperture, said flange having an inner face disposed in contacting relationship with a wall of said housing, wherein one of said tabs is attached to and extends from the inner face of said flange.

4. The metering device of claim 3 wherein said housing aperture is symmetrical.

* * * * *